United States Patent [19]
Farber

[11] 3,808,010
[45] Apr. 30, 1974

[54] SURFACE-COATING COMPOSITIONS
[75] Inventor: Leon Farber, Brooklyn, N.Y.
[73] Assignee: Tenneco Chemicals, Inc., Saddle Brook, N.J.
[22] Filed: Feb. 6, 1970
[21] Appl. No.: 9,441

Related U.S. Application Data
[63] Continuation-in-part of Ser. No. 730,629, May 20, 1968, abandoned.

[52] U.S. Cl............ 106/15, 106/16, 106/17, 106/18, 260/29.6 R, 260/45.7 S, 260/45.9 R, 260/543
[51] Int. Cl................................. C09d 5/14
[58] Field of Search............ 106/15 AF, 16, 17, 18; 260/45.7, 45.85, 45.9; 424/315

[56] References Cited
UNITED STATES PATENTS

| | | | |
|---|---|---|---|
| 3,062,710 | 11/1962 | Moyle et al. | 106/15 AF X |
| 3,085,041 | 4/1963 | Buchanan | 425/315 |
| 3,093,603 | 6/1963 | Gilchrist | 106/15 AF X |
| 3,181,992 | 5/1965 | Michalski et al. | 106/15 AF X |
| 3,223,536 | 12/1965 | Girard | 106/18 |
| 3,453,099 | 7/1969 | Popoff et al. | 71/103 |

FOREIGN PATENTS OR APPLICATIONS
581,099   8/1959   Canada

OTHER PUBLICATIONS
Hackh's Chemical Dictionary QD5, H3, 1969, C.31 (page 285 relied on).

*Primary Examiner*—Joseph L. Schofer
*Assistant Examiner*—H. J. Lilling
*Attorney, Agent, or Firm*—Evelyn Berlow

[57] ABSTRACT

4-Fluorosulfonylphenols and their derivatives that have the structural formula

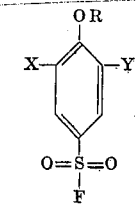

wherein $R$ represents hydrogen,

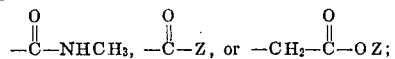

$X$ represents hydrogen, chlorine, an alkyl group having from one to five carbon atoms, or nitro; $Y$ represents hydrogen, chlorine, or an alkyl group having from one to five carbon atoms; and $Z$ represents hydrogen or an alkyl group having from one to five carbon atoms are used to protect surface-coating compositions from deterioration resulting from attack by fungi and other microorganisms. Illustrative of these biocides is 2-chloro-4-fluorosulfonylphenol.

10 Claims, No Drawings

SURFACE-COATING COMPOSITIONS

This application is a continuation-in-part of my copending application Ser. No. 730,629, which was filed on May 20, 1968 which has been abandoned.

This invention relates to surface-coating compositions that are resistant to attack by fungi and other microorganisms. More particularly, it relates to surface-coating compositions that contain a biocidal amount of a 4-fluorosulfonylphenolic compound and that have improved resistance to attack by fungi and other microorganisms.

It is well known in the art that paints and varnishes often have inadequate resistance to the action of microorganisms. Some of these coating compositions, such as enamels and house paints, contain as their resinous binders drying oils, oleoresinous varnishes, or alkyd resins, which are subject to attack by fungi. Others, for example, aqueous dispersions of water-insoluble synthetic linear polymers, generally contain as plasticizers and as thickeners materials that have their origin in animal or vegetable sources and that render the compositions susceptible to mildew. The resulting deterioration of the surface-coating compositions seriously hinders their full-scale utilization, particularly in those areas and in those applications that are conducive to such attack. Various biocidal materials have been suggested for use in surface-coating compositions, but none has proven entirely satisfactory in this application. Some do not provide the required prolonged protection against attack by microorganisms, while others undergo sulfide staining, and still others tend to separate from the applied coating by migration, volatilization, or leaching once the coating has been spread in a thin layer over the surface to be protected.

This invention relates to surface-coating compositions that contain biocidal amounts of certain 4-fluorosulfonylphenolic compounds. These biocides, which are thoroughly compatible with the resinous binders that are commonly used in surface-coating compositions and which are resistant to sulfide staining, provide excellent and prolonged resistance to deterioration resulting from attack by fungi, bacteria, or other microorganisms without adversely affecting the color, viscosity, and other physical properties of the surface-coating compositions.

The biocidal compounds that are used in the practice of this invention may be represented by the structural formula

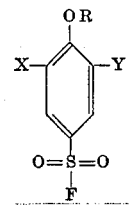

wherein $R$ represents hydrogen,

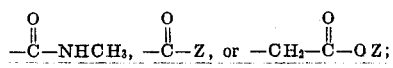

$X$ represents hydrogen, chlorine, an alkyl group having from one to five carbon atoms, or nitro; $Y$ represents hydrogen, chlorine, or an alkyl group having from one to five carbon atoms; and $Z$ represents hydrogen or an alkyl group having from one to five carbon atoms. Illustrative of these biocidal compounds are the following: 2-methyl-4-fluorosulfonylphenol, 2-chloro-4-fluorosulfonylphenol, 2,6-di-tert.butyl-4-fluorosulfonylphenol, 2,6-dichloro-4-fluorosulfonylphenol, 2-chloro-4-fluorosulfonylphenyl acetate, 2-nitro-4-fluorosulfonylphenoxyacetic acid, 2,6-dimethyl-4-fluorosulfonylphenyl-N-methylcarbamate, 2-chloro-6-nitro-4-fluorosulfonylphenoxyacetic acid butyl ester, 2-nitro-6-butyl-4-fluorosulfonylphenylbutyrate, and the like. One or more of these compounds may be present in the surface-coating compositions of this invention.

The fluorosulfonylphenolic compounds may be prepared by any suitable and convenient procedure. For example, fluorosulfonic acid may be reacted with the appropriate phenol to form substituted 4-fluorosulfonylphenols. The phenyl acetates may be prepared by heating the 4-fluorosulfonylphenols with acetic anhydride in a solvent such as benzene; the carbamates may be prepared by reacting the 4-fluorosulfonylphenols with methyl isocyanate in the presence of a solvent, such as tetrahydrofuran, and an amine catalyst. The preparation and properties of these compounds are described in detail in my copending patent application Ser. No. 730,629.

The fluorosulfonylphenolic compounds of this invention can be used to impart fungal and bacterial resistance to a wide variety of surface-coating compositions including both organic solvent-based and water-based coating systems. They are particularly valuable as biocides in coatings that contain as their resinous binder either an oleoresinous material or a water-insoluble synthetic linear addition polymer.

In a preferred embodiment of the invention, a 4-fluorosulfonylphenolic compound is used as the biocide in an organic solvent-based system that contains an oleoresinous binder. Suitable oleoresinous binders include drying oils, such as linseed oil, tung oil, soybean oil, dehydrated castor oil, safflower oil, or fish oil; bodied drying oils; blends of drying oils or bodied drying oils with a resin component, such as limed rosin, an ester gum, or a phenolic resin; oleoresinous varnishes formed by heating one of the afore-mentioned resins with one or more drying oils or bodied drying oils; and alkyd resins, which are resinous products resulting from the reaction of a polyhydric alcohol such as pentaerythritol or glycerol, with a dicarboxylic acid, such as phthalic anhydride, and fatty acids.

In another preferred embodiment of the invention, the biocidal compounds are used in aqueous dispersions that contain about 10 percent to 60 percent by weight of a water-insoluble resinous binder that is an oleoresinous binder as hereinbefore defined and/or a synthetic linear addition binder. The aqueous dispersions of synthetic linear addition polymers are ordinarily prepared by the emulsion polymerization of ethylenically unsaturated compounds, especially those of monoethylenically unsaturated character, although butadiene, chlorobutadiene, and isoprene may be used to some extent. Illustrative of the synthetic linear addition polymers that can be used as the resinous binder in the aqueous dispersions are polyvinyl acetate; polyvinyl butyrate; polyvinyl chloride; copolymers of vinyl acetate with vinyl chloride; copolymers of vinyl acetate with acrylonitrile; copolymers of vinyl chloride with acrylonitrile; copolymers of vinyl chloride with vinylidene chloride; polyethylene; polyisobutylene; polystyrene; copolymers of styrene with butadiene; copolymers of acrylonitrile with butadiene; copolymers of methacrylic acids esters of alcohols having one to eight carbon atoms with vinyl acetate, vinyl chloride, acrylonitrile, or styrene; copolymers of acrylic acid esters of alcohols having one to eight carbon atoms with vinyl acetate, vinyl chloride, acrylonitrile, or styrene; copolymers of the aforementioned acrylic acid esters, the aforementioned methacrylic acid esters, and acrylic acid; and copolymers of styrene with maleic anhydride.

Only a small concentration of the biocidal compound need be present in the surface-coating compositions of the present invention. It has been found that as little as 0.10 percent of one or more of these compounds, based on the weight of the composition, will bring about an appreciable improvement in the resistance of the composition to attack by microorganisms. Three percent or more of the biocidal compounds can be used, but these larger amounts generally do not provide further improvement in the properties of the surface-coating compositions and for this reason are not ordinarily used. While the amount of the biocidal compound that will provide optimum protection for a surface-coating composition depends upon such factors as the choice of biocidal compound, the choice of resinous binder and other components of the surface-coating composition and the amount of each that is used, and the application for which the coating composition is intended, in most cases about 1 percent to 2 percent of the biocidal compound, based on the weight of the surface-coating composition, is used.

In addition to the resinous binder and the biocidal compound, the surface-coating compositions of the present invention may contain various auxiliary materials, such as pigments, extenders, solvents, dyes, defoaming agents, driers, emulsifiers, dispersing agents, plasticizers, bactericides, and corrosion inhibitors, in the amounts ordinarily used for these purposes.

The 4-fluorosulfonylphenolic compound that is used as the biocide may be incorporated into the surface-coating composition by any convenient procedure. For example, it can be combined with the pigments and other components to form a pigment phase that is then mixed with the resinous binder and water or organic solvent to form the surface-coating composition. Alternatively, it can be added to a composition that contains the resinous binder, pigment, and water or organic solvent. The biocidal compound can be added as such to the other components of the surface-coating composition, or it can be added as a solution of the 4-fluorosulfonylphenolic compound in, for example, an alcohol, ether, or ketone. The invention is further illustrated by the examples that follow.

EXAMPLE 1

To 215 grams (2.15 moles) of fluorosulfonic acid in a flask immersed in a water bath at room temperature was added over a period of 90 minutes 52 grams (0.40 mole) of o-chlorophenol dissolved in 55 ml. of chloroform. The reaction mixture was stirred at room temperature for an additional 3 hours and then poured into ice water. The resulting mixture was filtered, and a solid product was recovered. There was obtained a 54 percent yield of 2-chloro-4-fluorosulfonylphenol that melted at 79.5°–83°C. and contained 34.53% C and 1.92% H (calculated, 34.1% C and 1.91% H).

EXAMPLE 2

To 100 grams (1 mole) of fluorosulfonic acid in a flask immersed in a water bath at room temperature was added 48.9 grams (0.3 mole) of 2,6-dichlorophenol in a period of 30 minutes. The reaction mixture was then heated to 130°C. over a period of two hours during which time the solid material suspended in the mixture dissolved. The reaction mixture was heated at 130°C. for 2 hours and then cooled and poured into ice water. The resulting mixture was filtered, and 44.2 grams of 2,6-dichloro-4-fluorosulfonylphenol was recovered. After recrystallization from cyclohexane, the product melted at 91°–91.5°C. and contained 29.33% C and 0.96% H (calculated, 28.9% C and 1.23% H).

EXAMPLE 3

Using the procedure described in Example 2, 2,6-di-tert.butyl-4-fluorosulfonylfluoride was prepared from fluorosulfonic acid and 2,6-di-tert.butylphenol. The product, which was obtained in a yield of 55%, was an oil that contained 58.5% C and 6.79% H (calculated 58.3% C and 7.34% H).

EXAMPLE 4

To 160 grams (1.60 mole) of fluorosulfonic acid in a flask immersed in an ice bath was added 64 grams (0.343 mole) of 2-chlorophenoxyacetic acid over a period of 30 minutes. The reaction mixture was stirred at room temperature 4 hours and then poured into ice water. The crude product obtained was washed several times with water and was then recrystallized from water. The 2-chloro-4-fluorosulfonylphenoxyacetic acid obtained was a white crystalline solid that melted at 155.5°–157°C. (dec) and contained 36.27% C and 2.53% H (calculated, 35.77% C and 2.25% H).

EXAMPLE 5

Using the procedure described in Example 4, 4-fluorosulfonylphenoxyacetic acid was prepared from fluorosulfonic acid and phenoxyacetic acid. The product, which was obtained in a yield of 67 percent, had a melting range of 163°–166°C. and contained 41.78% C and 3.01% H (calculated, 41.0% C and 3.01% H).

EXAMPLE 6

To a solution of 30 grams (0.136 mole) of 2-nitro-4-fluorosulfonylphenol in 320 ml. of benzene was added 30.62 grams (0.3 mole) of acetic anhydride. The mixture was heated at its reflux temperature for 3 hours and was then heated under reduced pressure to remove the solvent and other volatile materials. There was obtained 21.4 grams of 2-nitro-4-fluorosulfonylphenyl acetate which was an oil that contained 34.97% C, 1.97% H, and 5.50% N (calculated, 36.5% C, 2.29% H, and 5.33% N).

EXAMPLE 7

To 35.22 grams (0.2 mole) of 4-fluorosulfonylphenol dissolved in 200 ml. of tetrahydrofuran and 8 ml. of triethylamine was gradually added 11.42 grams (0.2 mole) of methyl isocyanate at 0°–5°C. The mixture was allowed to stand overnight at room temperature and was then heated under reduced pressure to remove the solvent. After recrystallization from chloroform, the 4-fluorosulfonylphenyl N-methyl carbamate melted at 130°–132°C. and contained 41.56% C 3.48% H, and 6.00% N (calculated, 3.50% H, and 6.05% N).

EXAMPLE 8

To 215 grams (2.15 mole) of fluorosulfonic acid in a flask immersed in a water bath at room temperature was added over a period of 90 minutes 55 grams (0.395 mole) of o-nitrophenol dissolved in 55 ml. of chloroform. The reaction mixture was stirred at room temperature for an additional 3 hours and then poured into ice water. The resulting mixture was filtered, and a solid product accompanied by some resinous material was recovered. Upon recrystallization from ether-benzin (60°–110°C.), 20.2 grams of 2-nitro-4-fluorosulfonylphenol was obtained. This product melted at 66°–69°C. and contained 32.3% C, 1.84% H, 6.23% N and 9.25% F (calculated, 32.6% C, 1.82% H, 6.34% N, and 8.60% F).

EXAMPLE 9

An exterior house paint was prepared by mixing together the following materials:

| | Parts by weight |
|---|---|
| Basic lead carbonate | 288 |
| Zinc oxide | 232 |
| Titanium dioxide (rutile) | 149 |
| Talc | 260 |
| Linseed oil (alkali refined) | 242 |
| Bodied linseed oil | 114 |
| Mineral spirits | 114 |
| Antiskinning agent (Exkin 2) | 2 |
| Manganese naphthenate (6%) | 2.27 |
| Lead naphthenate (24%) | 11.3 |

To samples of this paint was added 2 percent by weight of either one of the biocidal compounds of this invention or a comparative biocide.

This paint was evaluated by the following procedure: Pieces of drawdown paper were dipped into each of the paints, dried for 24 hours, and again dipped into the paint. After a 24-hour drying period, one of the samples coated with each of the paints was leached for 24 hours in accordance with Method 5831, CCC-T-191b. The coated paper samples were cut into 1¼ inch squares. Each of the coated paper squares was placed on a plate of malt and mycophil agar, which had been inoculated with 1 ml. of a suspension of the test organism. The plates, prepared in triplicate, were incubated at 28°C. and observed weekly. The growth was estimated according to the following key, and the results of the triplicate plates were averaged. In the tables that follow ZO = Zone of inhibition in mm.
0 = No zone of inhibition
1–10 = Increasing amounts of growth on specimen.

The 4-fluorosulfonylphenols and their derivatives used and the results of the tests are summarized in the table that follows:

TABLE I.—RESISTANCE OF OIL-BASED PAINT FILMS TO ATTACK BY FUNGI

| Fungicide | 2-chloro-fluoro-sulfonyl phenol | 4-fluoro-sulfonyl-phenyl-N-methyl carbamate | Bis-(phenyl mercuric) dodecenyl succinate (Super Ad-it) | 2,3,5,6-tetra-chloro-4-(methyl sulfonyl) pyridine (Dow 1013) |
|---|---|---|---|---|
| Effect on paint color: | | | | |
| Liquid | None | None | None | None |
| Film | None | None | None | None |
| Fungicidal activity: | | | | |
| *Pullularia pullulans:* | | | | |
| Unleached: | | | | |
| 1 week [1] | 0 | 1 | 0 | ZO-3 |
| 2 weeks | 0 | 2 | 1 | ZO-3 |
| 3 weeks | 0 | 2 | 1 | ZO-2 |
| 4 weeks | 1 | 3 | 1 | ZO-2 |
| Leached: | | | | |
| 1 week | 1 | 4 | 0 | ZO-2 |
| 2 weeks | 1 | 5 | 0 | ZO-2 |
| 3 weeks | 1 | 8 | 1 | ZO-2 |
| 4 weeks | 1 | 8 | 1 | ZO-2 |
| *Aspergillus niger:* | | | | |
| Unleached: | | | | |
| 1 week | 0 | 2 | ZO-7 | 0 |
| 2 weeks | 0 | 2 | ZO-7 | 1 |
| 3 weeks | 0 | 2 | ZO-3 | 1 |
| 4 weeks | 0 | 3 | ZO-3 | 1 |
| Leached: | | | | |
| 1 week | 1 | 2 | ZO-8 | 1 |
| 2 weeks | 1 | 2 | ZO-8 | 1 |
| 3 weeks | 1 | 3 | ZO-8 | 1 |
| 4 weeks | 1 | 3 | ZO-8 | 1 |

[1] Number of weeks at 28°C. and 90–95% relative humidity.

EXAMPLE 10

A. A polyvinyl acetate emulsion paint was prepared by mixing together the following materials:

| | Parts by weight |
|---|---|
| Water | 280 |
| Potassium pyrophosphate | 3 |
| Calcium metasilicate | 135 |
| Titanium dioxide (rutile) | 220 |
| 2% Aqueous solution of methylcellulose | 200 |
| Diethyl ether of diethylene glycol | 37 |
| Aqueous dispersion containing 55% by weight of polyvinyl acetate | 350 |

To samples of this paint was added either 2 percent by weight of one of the biocidal compounds of this invention or 2 percent by weight of a comparative biocide.

B. An acrylic paint was prepared by mixing together the following materials

| | Parts by weight |
|---|---|
| Water | 250 |
| Acrylic acid resin (100% solids) (Acryloid B-66) | 385 |
| Monoethyl ether of ethylene glycol | 259 |
| Titanium dioxide | 143 |
| Aluminum silicate | 45 |
| Magnesium silicate | 98 |

To samples of this paint was added either 2 percent by weight of one of the biocidal compounds of this invention or 2 percent by weight of a comparative biocide.

C. To samples of the acrylic paint and the polyvinyl acetate whose preparation is described above and the oil-based paint whose preparation is described in Example 9 were added varying amounts of the 4-fluorosulfonyl phenolic compounds or a comparative biocide. The paints were evaluated by the following procedure: Pieces of drawdown paper were dipped into each of the paints, dried for 24 hours, and again dipped into the paint. After a 24-hour drying period, the coated paper samples were cut into 1¼ inch squares. Each of the coated paper squares was placed on a plate of malt and mycophil agar, which had been inoculated with 1 ml. of a suspension of the test organism. The plates, prepared in triplicate, were incubated at 28°C. and observed weekly. The results obtained are summarized in Table II.

TABLE II.—RESISTANCE OF PAINT FILMS TO ATTACK BY FUNGI AND BACTERIA

| Biocide | 2-chloro-4-fluoro-sulfonyl-phenol | 4-fluoro-sulfonyl-phenyl-N-methyl carbamate | 2,6-ditert.-butyl-4-fluoro-sulfonol-phenol | 2,6-di-chloro-4-fluoro-sulfonyl phenol | 2-chloro-4-fluoro-sulfonyl-phenoxy-acetic acid | 4-fluoro-sulfonyl-phenoxy-acetic acid | 2-nitro-4-fluoro-sulfonyl-phenyl acetate | Bis-(phenyl-mercuric) dodecenyl-succinate (Super Ad-it) | 2,3,5,6-tet-rachloro-4-(methyl sylfonyl) pyridine (Dow 1013) |
|---|---|---|---|---|---|---|---|---|---|
| Acrylic paint: | | | | | | | | | |
| pH | 8.0 | 8.7 | 9.0 | 7.7 | 7.7 | 8.6 | 6.4 | 9.2 | 9.2 |
| *Pullularia pullulans:* | | | | | | | | | |
| 2% | ZO-25 | ZO-3 | | | | | | ZO-12 | ZO-13 |
| 1% | ZO-20 | ZO-1 | | | | | | ZO-6 | ZO-3 |
| *Penicillium crustosum:* | | | | | | | | | |
| 2% | ZO-20 | ZO-2 | | | | | | ZO-1 | ZO-7 |
| 1% | ZO-18 | ZO-1 | | | | | | 0 | ZO-1 |
| *Aspergillus niger:* | | | | | | | | | |
| 2% | ZO-23 | ZO-3 | | | | | | ZO-12 | ZO-6 |
| 1% | ZO-16 | ZO-2 | | | | | | ZO-8 | ZO-1 |
| *Bacillus subtilis,* 2% | ZO-13 | | ZO-1 | ZO-6 | ZO-4 | ZO-8 | ZO-9 | ZO-9 | ZO-8 |
| *Aerobacter aerogens,* 2% | ZO-3 | | ZO-1 | ZO-2 | ZO-3 | ZO-4 | ZO-1 | ZO-7 | ZO-1 |
| Polyvinyl acetate paint: | | | | | | | | | |
| pH | 6.8 | 7.2 | 7.3 | 6.0 | 5.5 | 5.3 | 6.2 | 6.7 | 7.3 |
| *Pullularia pullulans:* | | | | | | | | | |
| 2% | ZO-14 | ZO-21 | ZO-1 | ZO-8 | ZO-1 | ZO-1 | ZO-6 | ZO-14 | ZO-13 |
| 1% | ZO-10 | ZO-6 | ZO-1 | ZO-3 | | | ZO-1 | ZO-6 | |
| *Penicillium crustosum:* | | | | | | | | | |
| 2% | ZO-14 | ZO-5 | | | ZO-1 | ZO-1 | ZO-5 | ZO-6 | ZO-10 |
| 1% | ZO-6 | ZO-1 | | | | | ZO-2 | ZO-2 | |
| *Aspergillus niger:* | | | | | | | | | |
| 2% | ZO-20 | ZO-14 | | ZO-3 | ZO-1 | ZO-1 | ZO-5 | ZO-15 | ZO-6 |
| 1% | ZO-14 | ZO-10 | | ZO-1 | ZO-1 | ZO-1 | ZO-1 | ZO-4 | |
| *Bacillus subtilis,* 2% | ZO-13 | ZO-9 | ZO-1 | | ZO-1 | ZO-1 | Z-10 | ZO-10 | ZO-8 |
| *Aerobacter aerogenes,* 2% | ZO-2 | ZO-4 | ZO-1 | ZO-1 | | | ZO-1 | ZO-2 | |
| Oil-based paint: | | | | | | | | | |
| *Pullularia pullulans,* 2% | ZO-23 | ZO-3 | ZO-3 | ZO-2 | ZO-4 | ZO-1 | ZO-10 | ZO-10 | ZO-12 |
| *Penicillium crustosum,* 2% | ZO-14 | ZO-2 | ZO-4 | ZO-2 | ZO-3 | ZO-1 | ZO-5 | ZO-5 | ZO-10 |
| *Aspergillus niger,* 2% | ZO-24 | ZO-4 | ZO-3 | ZO-3 | ZO-1 | ZO-1 | ZO-5 | ZO-13 | ZO-9 |

From the data in the tables it will be seen that the 4-fluorosulfonylphenols and their derivatives and effective biocides for both water-based and oil-based paints. They impart to these paints resistance to attack by microorganisms that is maintained even after leaching. They do not affect the color, viscosity, or heat-aging characteristics of the paints. Unlike those containing bis(phenylmercury)dodecenyl succinate as the biocide, the paint films that contain the biocides of this invention do not undergo gray or black staining when they are exposed to hydrogen sulfide.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. A surface-coating composition having improved resistance to attack by fungi and bacteria that comprises (a) a water-insoluble resinous binder selected from the group consisting of oleoresinous binders, synthetic linear addition polymers obtained by the vinyl polymerization of monoethylenically-unsaturated molecules, and mixtures thereof, and (b) about 0.10 percent to 3 percent, based on the weight of said composition, of a compound having the structural formula

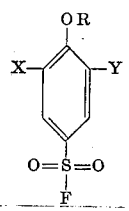

wherein $R$ represents hydrogen,

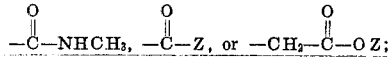

$X$ represents hydrogen, chlorine, an alkyl group having from one to five carbon atoms, or nitro; $Y$ represents hydrogen, chlorine, or an alkyl group having from one to five carbon atoms; and $Z$ represents hydrogen or an alkyl group having from one to five carbon atoms.

2. A surface-coating composition as set forth in claim 1 that contains 1 percent to 2 percent, based on the weight of said composition, of 2-chloro-4-fluorosulfonylphenol.

3. A surface-coating composition as set forth in claim 1 that contains 1 percent to 2 percent, based on the weight of said composition, of 4-fluorosulfonylphenyl-N-methyl carbamate.

4. A surface-coating composition as set forth in claim 1 that contains 1 percent to 2 percent, based on the weight of said composition, of 2-chloro-4-fluorosulfonylphenoxyacetic acid.

5. A surface-coating composition as set forth in claim 1 that contains 1 percent to 2 percent, based on the weight of said composition, of 2-nitro-4-fluorosulfonylphenyl acetate.

6. A surface-coating composition as set forth in claim 1 wherein the resinous binder is a drying oil.

7. A surface-coating composition as set forth in claim 1 wherein the resinous binder is polyvinyl acetate.

8. The method of controlling the growth of fungi and bacteria in a surface-coating composition that contains a water-insoluble resinous binder selected from the group consisting of oleoresinous binders, synthetic linear addition polymers obtained by the vinyl polymerization of monoethylenically-unsaturated molecules, and mixtures thereof which comprises incorporating in said composition about 0.10 percent to 3 percent, based on the weight of said composition, of a compound having the structural formula

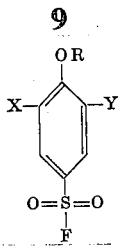

wherein R represents hydrogen,

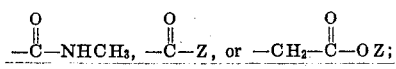

X represents hydrogen, chlorine, an alkyl group having from one to five carbon atoms, or nitro; Y represents hydrogen, chlorine, or an alkyl group having from one to five carbon atoms; and Z represents hydrogen or an alkyl group having from one to five carbon atoms.

9. The method of claim 8 wherein 1 percent to 2 percent, based on the weight of the composition, of 2-chloro-4-fluorosulfonylphenol is incorporated into the composition.

10. The method of claim 8 wherein 1 percent to 2 percent, based on the weight of the composition of 2-nitro-4-fluorosulfonylphenyl acetate is incorporated into the composition.

* * * * *